United States Patent [19]
Tojo et al.

[11] 4,262,974
[45] Apr. 21, 1981

[54] LINEAR BEARING APPARATUS

[75] Inventors: Toru Tojo, Yamato; Yoshinori Nishio, Yokohama, both of Japan

[73] Assignee: Tokyo Shibaura Denki Kabushiki Kaisha, Kawasaki, Japan

[21] Appl. No.: 82,226

[22] Filed: Oct. 4, 1979

[30] Foreign Application Priority Data

Oct. 12, 1978 [JP] Japan .................. 53-124623

[51] Int. Cl.³ .................. F16C 29/04; F16C 29/12
[52] U.S. Cl. .................. 308/6 R; 308/3 A; 308/3.8
[58] Field of Search .............. 308/6 R, 3 A, 3.8, 3.6; 312/341 R, 342

[56] References Cited
U.S. PATENT DOCUMENTS

| | | | |
|---|---|---|---|
| 3,907,385 | 9/1975 | Bartenstein | 308/3 A |
| 4,030,786 | 6/1977 | Schluter et al. | 308/6 R |
| 4,149,319 | 4/1979 | Nelle | 308/6 R |

OTHER PUBLICATIONS

Schneeberger Linear Bearings Catalogue, Linear Bearings and Frictionless Tables, pp. 26-27, (1975).

Primary Examiner—Lenard A. Footland
Attorney, Agent, or Firm—Oblon, Fisher, Spivak, McClelland & Maier

[57] ABSTRACT

A linear bearing apparatus embodying this invention comprises a pair of mutually facing guide rails provided between two physical bodies reciprocating in the prescribed direction relative to each other; a retainer assembly disposed between the paired guide rails and formed of a plurality of rolling elements and a retainer; a pair of racks fitted to the two physical bodies; a pinion engaged with both racks; and elastic coupling means for elastically connecting the pinion to the retainer assembly and causing the retainer assembly to be shifted for the distance through which the pinion is moved.

6 Claims, 15 Drawing Figures

LINEAR BEARING APPARATUS

This invention relates to a linear bearing apparatus comprising:

a first guide rail fitted to a first physical body to extend lengthwise thereof and a second guide rail fitted to a second physical body to extend lengthwise thereof, said second physical body being moved toward either sense of the prescribed direction relative to the first physical body; and a retainer assembly which is disposed between the first and second guide rails and is formed of a plurality of rolling elements and a retainer for supporting said rolling elements, and, where the second physical body is moved for a certain distance relative to the first physical body, is shifted relative to the first physical body for substantially half said distance toward the same sense toward which the second physical body is carrid.

A linear bearing apparatus of the above-mentioned type is widely applied to an XY table device of a machining or measuring implement designed to carry a material to be worked or measured (hereinafter referred to as "a work"). However, the conventional linear bearing apparatus is not adapted for application to a precision device, particularly the type which is continuously used for long hours in the field of the semiconductor industry.

With the XY table device in general use, the size of the table, the dimensions of the retainer assembly and the allowable moving distance of the table are defined in consideration of the above-mentioned arrangement by which the retainer assembly is moved for about half the distance through which the table is carried. As a result, the retainer assembly supports the XY table device, insofar as the assembly is not unduly removed from the center of the XY table, thereby ensuring the precision operation of the XY table device. However, it usually happens with the prior art linear bearing device that during the repeated reciprocation of the XY table the retainer assembly is gradually displaced (this event is hereinafter referred to as "a drift") toward either sense of the reciprocating direction of the XY table due to the dimensional error of the guide rails or the misadjustment of the whole linear bearing device. The above-mentioned drift gives rise to the difficulties that the retainer assembly eventually protrudes from the guide rails propably in collision with surrounding members, resulting in the damage of the retainer assembly itself and/or said surrounding members. Even where the situation is not so worsened as to bring about the above-mentioned event, the linear bearing device undesirably supports the XY table in the proximity of its periphery, thereby causing the XY table to be inclined to its prescribed position. Therefore, the table loses precision in respect of its former position, resulting in a fall in work precision.

Accordingly, it is demanded that after having carried for a distance approximately half the moving distance of the XY table, the retainer assembly be prevented from being drifted toward the guide rails. Or even where it is impossible to realize such arrangement, it is preferred that the retainer assembly be prevented from at least protruding from the guide rails.

To data, various measures have been taken to avoid the drift of the retainer assembly. A first method proposed for this purpose is to fit a stopper to both ends of each of the paired guide rails, thereby preventing the retainer assembly from protruding beyond the stoppers even when the retainer assembly drifts. Though simple, this process still has the drawback that, where the XY table is further forcefully carried to that sense of the reciprocating direction of said table toward which the retainer assembly has already drifted, to be brought to rest by the stopper provided at one end of the separately fixed guide rail then the rolling elements of the retainer assembly do not roll, but squeakingly slide over the surface of the guide rail provided on the XY table, thus undesirably giving rise to abrasion between the rolling elements of the retainer assembly and the guide rail of the XY table. Further where the retainer assembly is so displaced as to touch the stopper, then the reciprocating speed of the XY table is reduced to zero with the resultant change in the degree of an acceleration. Accordingly, a work mounted on the XY table is sometimes damaged or displaced from its prescribed position. All the above-mentioned objectionable events raise serious problems in the measurement of the dimensions of a work or its machining which is to be carried but with higher precision than 1/1000 mm. Therefore the aforesaid first process does not prove satisfactory.

A second method proposed to prevent the drift of the retainer assembly is to fix a rack to the XY table and another rack to the table rest, both racks being so positioned as to face each other, provide a pinion between both racks for engagement therewith, connect the pinion movable with the reciprocating XY table to the retainer assembly, thereby allowing the retainer assembly to be carried to the same extent as the movement of the pinion, that is, for half the travelling distance of the XY table. With this type of linear bearing device, the rolling elements of said device smoothly roll along the guide rail of the XY table, substantially preventing the damage of the rolling elements themselves and the surface of the guide rail of the XY table along which the rolling elements roll. Since the position of the retainer assembly is defined by the movement of the moving pinion, there is no possibility that no matter how often the XY table is reciprocated, the continuously drifting retainer assembly reaches the proximity of the periphery of the XY table, or is a worse case protrudes from the guide rail. The above-mentioned second method makes it unnecessary to provide a stopper at both ends of each of the paired guide rails, thereby eliminating the vibration or shocks of the XY table which might otherwise result from the collision of the retainer assembly with such stoppers.

The second method is indeed very skilful, but still has much room to be desired. Namely, the problem with the second method is that errors arise in the manufacture of the rack and pinion and their assembly, causing the movements of the retainer assembly and the rack fitted to the XY table (consequently the movements of said XY table and guide rail thereof) the interact with each other, and eventually imparting vibrations/or shocks to the XY table. The above-mentioned objectionable events noticeably take place particularly when the XY table begins to move and also when it is brought to rest.

It is accordingly the object of this invention to provide a linear bearing apparatus which is free from the drawbacks accompanying the prior art linear bearing device, and, wherein, even when two physical bodies respectively provided with a guide rail make a relative reciprocating movement, the retainer assembly does not continuously drift up to the end of the guide rails nor pratrude therefrom; and neither of said two physical bodies is subject to vibrations or shocks.

To attain the above-mentioned object, this invention provides a linear bearing apparatus which comprises urging means designed to impart an elastic force to the retainer assembly to prevent said retainer assembly from progressively drifting, when the second physical body is repeatedly moved relative to the first physical body toward either sense of the prescribed direction.

With a linear bearing apparatus according to one embodiment of this invention, an arm is provided, as shown in FIG. 4, at both ends of a guide rail fitted to a guide rail so as to extend lengthwise of said guide rail. A tension spring is stretched between the outer end of the arm and that end of the retainer assembly which faces said outer end of the arm. Therefore, the retainer assembly is always urged toward the center of the guide rail where a balance is established between a force exerted by a tension spring provided at one end of the linear bearing apparatus and a force exerted by a tension spring disposed at the other end of said apparatus. Consequently, the retainer assembly is prevented from drifting further outward from a point to which said assembly is normally brought by the relative movement of the paired guide rails. What is worthy of notice in this case is that an urging force applied to the retainer assembly to stop its drift resulting from the repeated relative movements of two physical bodies or to cause the retainer assembly to be slowly carried toward the opposite sense to that toward which the retainer assembly would drift has only to be very weak. Such weak urging force applied to the retainer assembly prevents a decline in the precision with which the position of the guide rail and consequently a physical body fitted therewith with is to be controlled.

With a linear bearing apparatus according to a second embodiment of this invention, a rack is fitted to each of the two physical bodies to be moved with the guide rails thereof. A pinion is provided for engagement with both racks. The movement of the pinion is directly transmitted to the retainer assembly by means of elastic coupling means. This second embodiment is substantially the same as the second prior art method proposed to prevent the drift of the retainer assembly, except that elastic coupling means is provided to establish connection between the retainer assembly and pinion. The linear bearing apparatus according to the second embodiment of the invention not only has the advantage offered by the above-mentioned second prior art process but also a advantage to suppress the occurrence of vibration and/or shock motion of the physical bodies generated by the interaction between the movement of the retainer assembly and that of the racks (consequently the guide rail and the physical body fitted therewith), the above vibration and/or shock being derived from error in manufacture of racks and pinion and misassembly thereof.

This invention can be more fully understood from the following detailed description when taken in conjunction with the accompanying drawings, in which.

Figure 7:
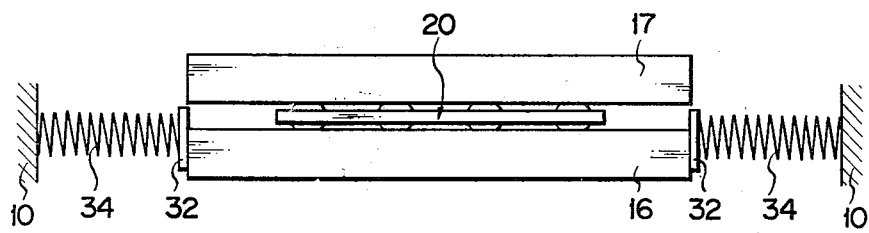
Figure 8:
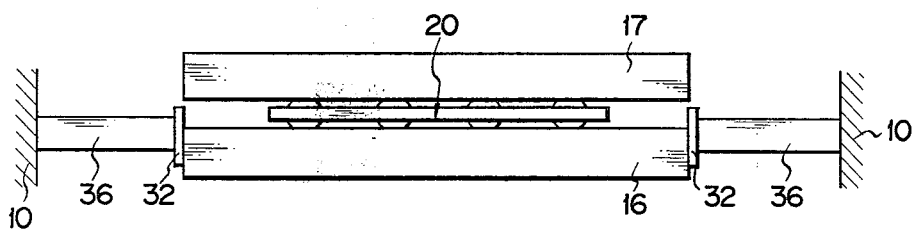
Figure 9:
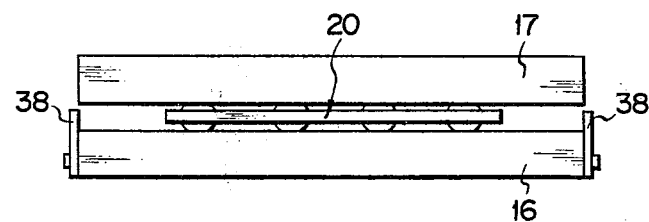
Figure 10:
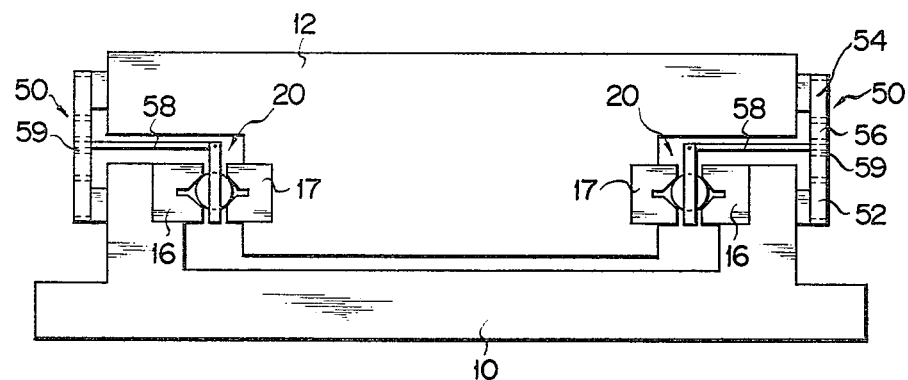
Figure 11:
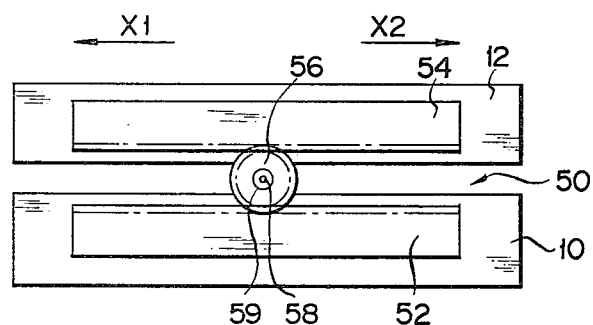
Figure 12:
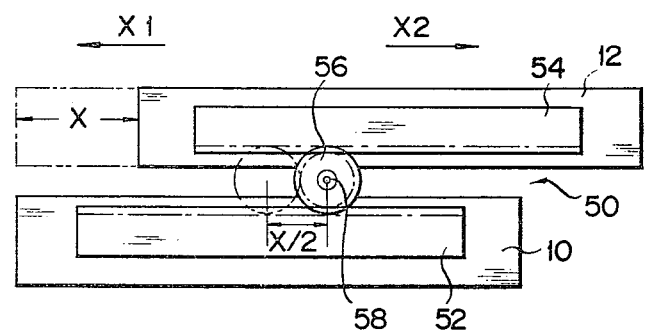
Figure 13:
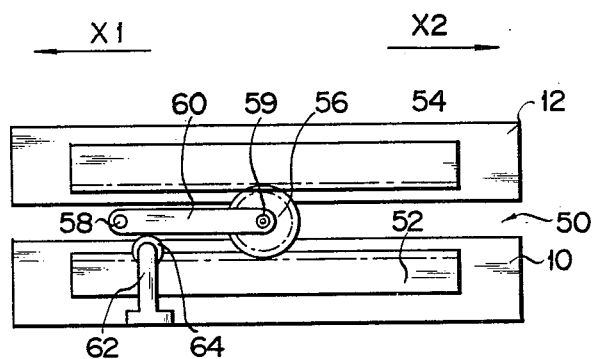
Figure 14:
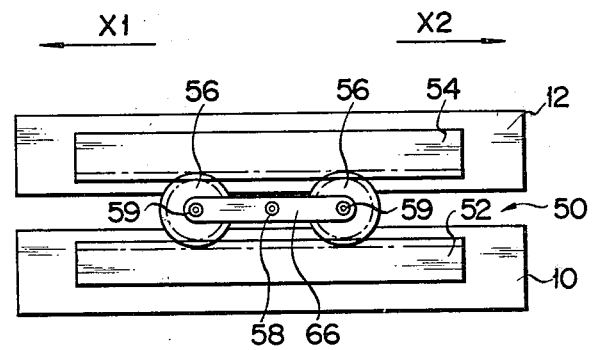
Figure 15:
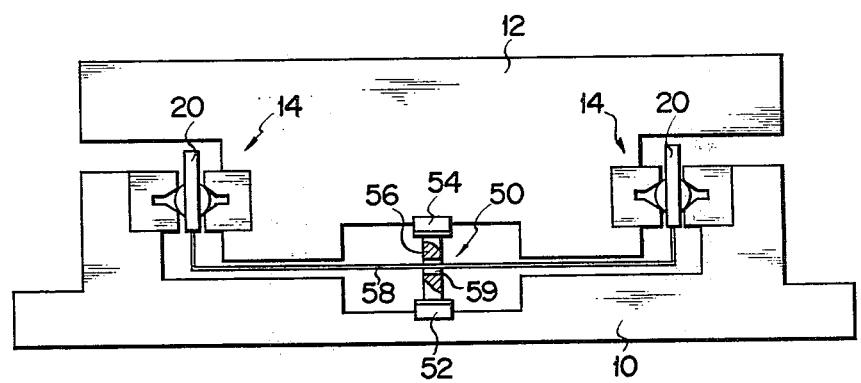

FIG. 7 indicates a linear bearing apparatus according to the second embodiment of the invention;

FIGS. 8 and 9 are the modifications of FIG. 7;

FIG. 10 is a front view of a linear bearing apparatus according to a third embodiment of the invention fitted to the table and table rest;

FIG. 11 is a side view of the linear bearing apparatus according to the third embodiment of FIG. 10, where the rack-pinion mechanism is in the standard position;

FIG. 12 is a side view of the rack-pinion mechanism of FIG. 11, when a pair of racks are moved relative to each other;

FIGS. 13 and 14 illustrate the modification of the third embodiment of FIG. 10; and FIG. 15 shows a linear bearing apparatus according to a fourth embodiment of the invention.

Figure 1:
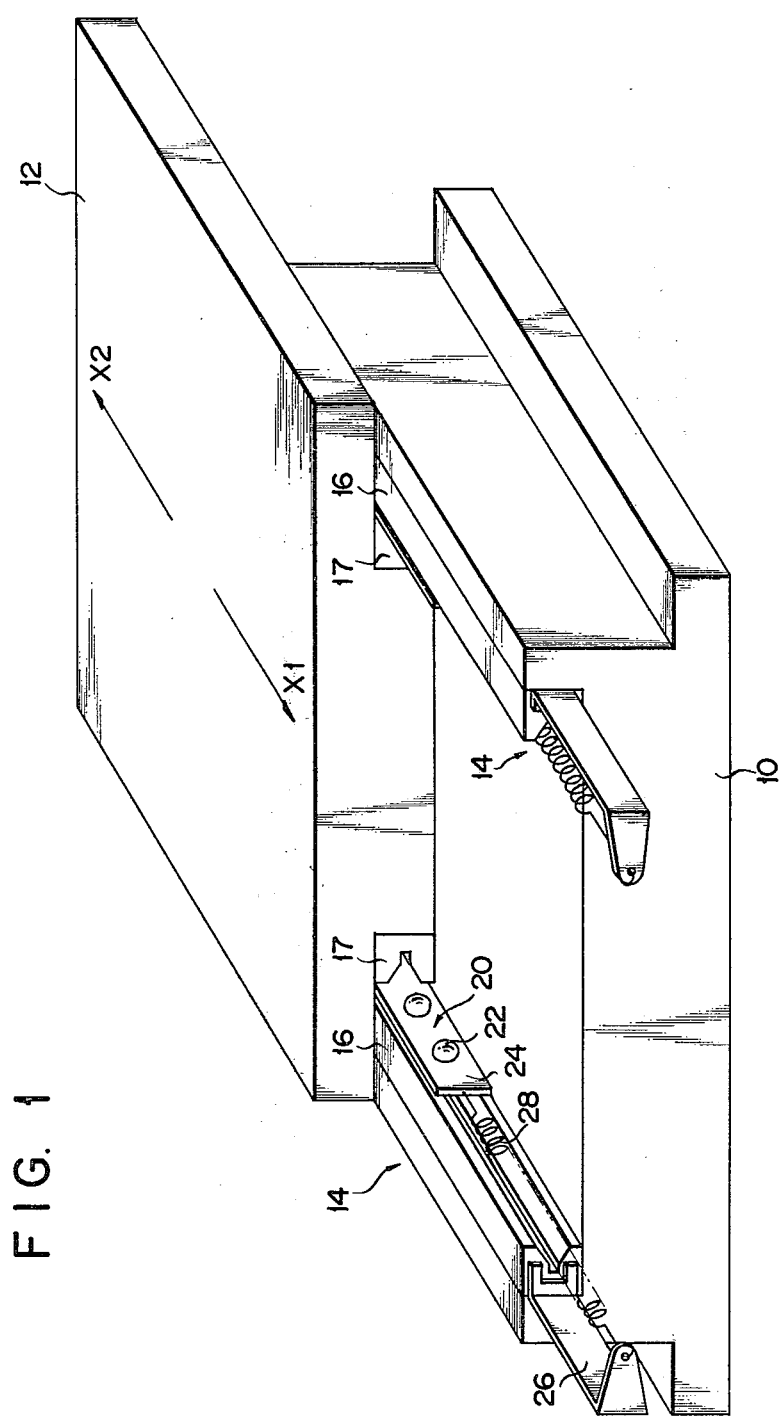
FIG. 1 is an oblique view of a linear bearing apparatus according to a first embodiment of this invention fitted between a table and table rest.

There will now be described the linear bearing apparatus embodying this invention by reference to the accompanying drawings. All the embodiments described herein relate to a linear bearing apparatus used with an XY table device which is demanded to have a high dimensional precision. FIG. 1 shows a linear bearing apparatus and the associated parts when the table 12 of said XY table apparatus on which a work is to be mounted is linearly reciprocated in the direction of X1-X2 by proper drive means (not shown).

Figure 2:
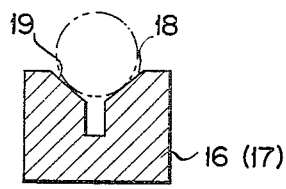
FIG. 2 is a cross sectional view of the guide rail of FIG. 1.
Figure 3:
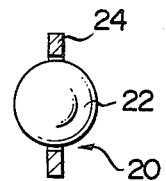
FIG. 3 is a cross sectional view of the retainer assembly of FIG. 1.

Reference numeral 10 denotes a table rest or a first physical body. The table 12, or a second physical body reciprocates in the direction of X1-X2 relative to the table rest 10. A pair of linear bearing apparatuses 14 are provided between the table 12 and table rest 10. Since both linear bearing apparatuses 14 have the same construction and function, only one of them described. Reference numeral 16 denotes a pair of parallel extending guide rails set on the table rest 10. Reference numeral 17 shows a pair of parallel extending guide rails fitted to the table 12. One group of the guide rails 16, 17 face another group of the guide rails 16, 17. FIG. 2 is a cross sectional view of the respective guide rails 16, 17. Each guide rail is provided with a V-shaped groove 18 having a surface 19 along which the balls or rolling elements 22 of the linear bearing apparatus are guided (this surface 19 is hereinafter referred to as a rolling element guiding surface). Reference numeral 20 denotes a retainer assembly disposed between the guide rails 16, 17 provided on either side of the linear bearing apparatus. The retainer assembly comprises a plurality of balls 22 rolling along the rolling element-guiding surface 19 and a retainer 24 for supporting the rolling members 22. FIG. 3 is a cross sectional view of the retainer assembly 20. The balls 22 substantially roll along the roller-guiding surface 19 in contact therewith, thereby enabling the table 20 to be carried along the table rest 10. Throughout all the embodiments, the rolling element are formed of balls 22. However, it is possible to replace the balls by rollers. Where, however, rollers are used, the dimensional form of the rolling element-guiding surface 19 has obviously to be changed into that adapted to roller for the smooth rolling movement.

Reference numeral 26 shows four spring-fitting numbers, which extend outward from both ends of the respective guide rails 16, 17. A tension spring 28 is stretched between the forward end of each spring-fitting member 26 and the forward end of each retainer assembly 20. All the tension springs 28 have substantially the same property. Wherever, therefore, the retainer assembly 20 may be set, said assembly 20 is always urged toward a point at which the tensile forces of the tension springs 28 provided at both ends of the retainer assembly 20 are substantially balanced.

Figure 4:
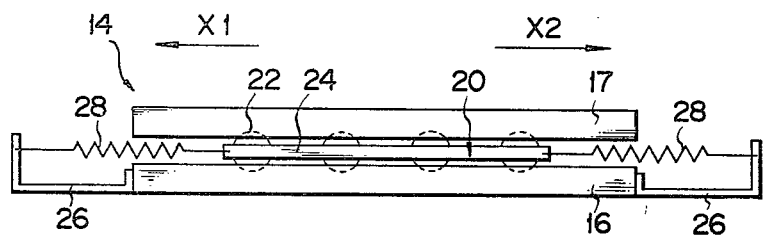
FIG. 4 is a plan view of the linear bearing apparatus of FIG. 1 when set in the standard state.
Figure 5:
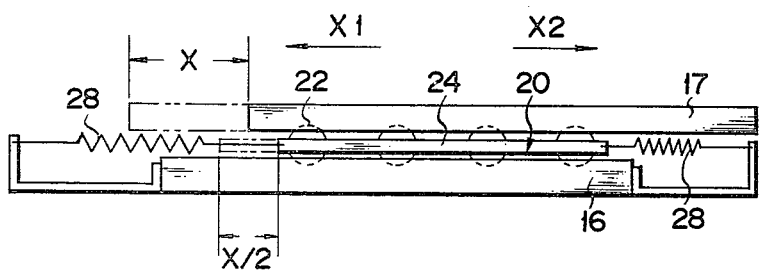
FIG. 5 is a plan view of the linear bearing apparatus of FIG. 4 when the two guide rails of said apparatus are moved relative to each other.

There will now be described by reference to FIGS. 4 and 5 the operation of a linear bearing apparatus according to a first embodiment of this invention. FIG. 4 is a plan view of the right side linear bearing apparatus 14 of FIG. 1 when said apparatus 14 is in the later described standard state. The position of the table 12 and that of the retainer assembly 20 lying in the state illustrated in FIG. 4 are referred to as the standard position of the respective members. As used herein, the term "standard state" is defined to mean that in which the table 12, guide rails 16, 17, retainer assembly 20 and table rest 10 are vertically arranged, as shown FIG. 4, in the order mentioned substantially in a concentric state; all the tension springs 28 are stretched to substantially the same length; and the tension springs apply substantially the same tensile forces to the retainer assemblies 20.

Where the table 12 (not shown) lying in the standard state (FIG. 4) and consequently the guide rail 17 are moved for a distance X (FIG. 5) toward the sense X2, then the guide rail 17 is shifted from the 2 dots-dash line position to the solid line position apart therefrom by said distance X. As a result, the retainer assembly 20 is moved for substantially half said distance X due to the rolling of the balls 22 of said retainer assembly 20. At this time, the tension spring 28 on the left side of FIG. 5 is stretched by the extent of X/2, whereas the tension spring 28 on the right side of FIG. 5 is contracted by the extent of X/2. As a result, the retainer assembly 20 is urged toward the standard position. However, the retainer assembly 20 which is clamped between the corresponding guide rails 16, 17 can not move at all, but remains in situ.

While, however, the table 12 (consequently the guide rail 17) repeatedly reciprocates towards the senses X1, X2 alternatively, the retainer assembly 20 progressively travels toward the standard position by the action of the tension spring 28. Where, therefore, the retainer assembly 20 tends to further drift toward the sense X2 due to a decline in the precision with which said retainer assembly 20 and guide rails 16, 17 are machined or a probable asymmetry occurring in the assembling of these members, then the retainer assembly 20 is prevented from being carried toward the sense X2. This advantageous effect is also displayed when the table 12 is moved toward the sense X1.

Figure 6:
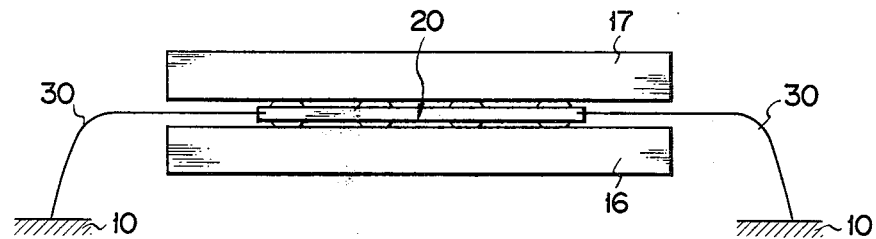
FIG. 6 shows a modification of the first embodiment of FIG. 4.

FIG. 6 shows a modification of the linear bearing apparatus of FIG. 4. In this case, the urging means is formed of a spring member 30, for example, a plate spring in place of the tensile spring 28. This plate spring 30 has one end fitted to the table rest 10 and the other end fitted to the end of the retainer assembly 20 and applies a tensile force to said retainer assembly 20 to let it protrude outward from between the guide rails 16, 17. The embodiment of FIG. 6 obviously displays the same effect as the embodiment of FIG. 5, description thereof being omitted.

FIG. 7 shows a linear bearing apparatus according to a second embodiment of this invention. This second embodiment, comprises a pair of compression springs 34, each of which has one end supported by the side wall of the table rest 10 and the other end fitted with a push board 32. A pair of push boards 32 are pressed against both ends of the guide rail 16 by the corresponding compression springs 34. The push board 32 is extended in the direction in which said board covers a space between the guide rails 16, 17. Where, therefore, the retainer assembly 20 drifts and tends to protrude from a space between the guide rails 16, 17 toward either sense X1 or X2, the compression spring 34 pushes the retainer assembly 20 in the opposite direction to that in which the retainer assembly 20 drifts, thereby preventing said assembly 20 from further drifting to protrude from said space. The push board 32 and compression spring 34, jointly constitute urging means.

FIG. 8 illustrates a modification of the embodiment of FIG. 7. With this modification, the compression spring 34 of FIG. 7 is replaced by an elastic member 36 which is made of elastic material such as rubber and kept in a compressed state.

FIG. 9 shows another modification of the embodiment of FIG. 7. With this second modification, the compression spring 34 of FIG. 7 used as urging means is replaced by, for example, a plate spring 38, one end of which is fitted to the guide rail 16, and the other end of which protrudes into a space between the guide rails 16, 17 through which the retainer assembly 20 is carried. The modification of FIG. 9 displays the same effect as that produced by the compression spring 34 and push board 32 of FIG. 7.

There will now be described by reference to FIGS. 10, 11, and 12 a linear bearing apparatus according to a third embodiment of this invention. FIG. 10 illustrates the linear bearing apparatus according to the third embodiment fitted to the table 12 and table rest 10, with the table 12 arranged to move in a direction perpendicular to the surface of the drawing by a linear bearing apparatus which includes the same linear bearing apparatus 14 as that of FIG. 1. The third embodiment of FIGS. 10 to 12 widely differs from the first and second embodiment in that as shown in FIGS. 10 and 11, a pair of gear mechanisms 50 are fitted to both sides of the table 12 and table rest 10. FIG. 11 shows the associated parts of the table 12 and table rest 10 and one of the paired gear mechanisms 50 alone of FIG. 11 as viewed from the right side of FIG. 10. With the third embodiment of FIGS. 10 and 11, the urging means comprises the gear mechanism 50 and elastic coupling member 58. The paired gear mechanisms 50 are each formed of a pair of racks 52, 54 arranged parallel with the direction in which the table 12 is moved, and a pinion 56 engaged with both racks. The pinion 56 is carried with the table 12 in the same direction for half the distance through which the table 12 is moved. The movement of the pinion 56 is transmitted to the retainer assembly 20 by means of an elastic coupling member 58. This coupling member 58 and pinion 56 are connected together by, for example, a miniature bearing 59 fitted to the shaft of the pinion 56. FIG. 11 shows the relative positions of the paired racks 52, 54 and the pinion 56, when the linear bearing apparatus 14 is in a standard state in which the table 12, table rest 10, paired guide rails 16, 17 retainer assembly 20, paired racks 52, 54, and pinion 56 are concentered.

There will now be described by reference to FIGS. 11 and 12 the operation of a linear bearing apparatus according to a third embodiment of this invention.

Where the table 12 is carried toward the sense X2 for a distance X from its standard position shown in FIG. 11, then the rack 54 is also moved toward the sense X2 for the same distance X. However, the pinion 56 is shifted toward the sense X2 only half said distance X as illustrated in FIG. 12. The standard left side positions of the table 12 and rack 54 and the standard position of the pinion 56 are indicated in 2 dots-dash lines (FIG. 12). The above-mentioned movement of the pinion 56 for a distance of X/2 is transmitted to the retainer assembly 20 (FIG. 10) by means of the elastic coupling member 58. As a result, the retainer assembly 20 is moved like the pinion 56 from its standard position toward the same sense X2 for a distance of X/2. If, in this case, incoincidence should happen between the movement of the retainer assembly 20 and that of the pinion 56, the incoincidence will be absorbed by the deformation of the elastic coupling member 58. Thus, the retainer assembly 20 is urged in the direction in which said incoincidence is eliminated by a force resulting from the deformation of the coupling member 58. Eventually, the retainer assembly 20 is shifted for a distance of X/2 relative to the guide rail 16 (FIG. 10).

Where the table 12 repeatedly reciprocates, and the retainer assembly 20 drifts, then a force which results from the deformation of the elastic coupling member 58 and acts in the opposite direction to the drift of the retainer assembly 20 restricts said drift to the proximity of the normal position of the retainer assembly 20. Therefore, the retainer assembly 20 is prevented from drifting up to the end of the guide rail 16 or protruding therefrom. The coupling member 58 of FIG. 10 is produced from, for example, a narrow elastic piano wire.

As a described above, the paired gear mechanisms 50 cause the retainer assembly 20 to be shifted for half the distance X through which the table 12 is carried. The distance, of X/2 denotes the amount of the movement of the retainer assembly 20 which is caused by a plurality of balls 22 (FIG. 10) of said retainer assembly 20 rolling along the rolling element-guiding surfaces 19 of the guide rails 16, 17. Since the retainer assembly 20 is engaged with the pinion 56 by means of the elastic coupling member 58, the balls 22 of the retainer assembly 20 smoothly roll along the rolling element-guiding surface 19 of the guide rails 16, 17 substantially without squeaking friction with said surface 19, thereby prolonging the like of the linear bearing apparatus.

In addition of the aforesaid function, the elastic coupling member 58 offers the undermentioned advantage. If the pinion 56 and retainer assembly are rigidly coupled with each other, then a abnormally strong force will be applied to the rolling elements from the retainer to render the table subject to vibrations and/or shocks as have already been experienced with the prior art linear bearing apparatus, causing a work mounted on the table 12 to be damaged or displaced from its set position. However, the elastic coupling member 58 used with the third embodiment of FIGS. 10 to 12 eliminates the above-mentioned difficulties. In other words, the elastic coupling member 58 absorbs the vibrations and/or shocks which might otherwise be imparted to the table 12 due to the interaction between the pinion 56 move with the table 12 and retainer assembly 20 resulting from errors in the manufacture of the racks 52, 54 and pinion 56 and their assembly. As a result, the table 12 can be moved substantially smoothly.

There will now be described by reference to FIG. 13 a modification of the third embodiment of FIGS. 10 to 12. This modification is provided with urging means different from that of the third embodiment. With the modification of FIG. 13, the retainer assembly 20 (this is disposed on the backside of the drawing and is unrelates to the motion of the gear member 50 and consequently is not shown) is not directly engaged with the pinion 56, but with an arm 60 fitted to the shaft of the pinion 56 by means of a miniature ball bearing 59 and the elastic coupling member 58 fitted to the forward end of the arm 60 and extended to the backside of the drawing. The arm 60 is supported by a pulley 64, fitted to the upper end of a support erected on the table rest 10, thereby being prevented from rotating counterclockwise about the shaft of the pinion 56. Since the retainer assembly 20 is driven by the forward end of the arm 60 moving at right angles to the shaft of the pinion 56, the modification of FIG. 13 has the same effect as the third embodiment of FIGS. 10 to 12.

FIG. 14 illustrates urging means different from that used with the modification of FIG. 13. The modification of FIG. 14 comprises two pinions 56 both engaged with the paired racks 52, 54. The two pinions 56 are spaced from each other at the prescribed distance by a coupling board 66 connected to said pinions 56 by a pair of miniature bearings 59. The movements of both pinions 52, 54 are transmitted to the retainer assembly 20 by an elastic coupling member 58, one end of which is fitted to the substantially central part of the coupling board 66 and the other end of which is attached to the retainer assembly 20. The modification of FIG. 14 has the same effect as the embodiment of FIGS. 10 to 12.

There will now be described by reference to FIG. 15 a linear bearing apparatus according to a fourth embodiment of this invention. This fourth embodiment comprises urging means different from that of the third embodiment of FIGS. 10 to 12. With this fourth embodiment, the table 12 and table rest 10 are connected by a pair of linear bearing apparatuses as in the third embodiment. However, a single set of the gear mechanism 50 and elastic coupling member 58 is provided at a spot different from that of FIG. 10. A pair of racks 52, 54 are so fitted to the center of FIG. 15 as to face the table 12 and table rest 10 respectively. A pinion 56 engageable with the paired racks 52, 54 is positioned therebetween. The shaft of the pinion 56 is connected to the paired retainer assemblies 20 by the elastic coupling member 58 attached to the pinion 56 by means of the miniature bearing 59. The linear bearing apparatus according to the fourth embodiment of FIG. 15 obviously displays the same effect as the third embodiment of FIG. 10, detailed description thereof being omitted.

The fourth embodiment of FIG. 15 which is provided with the indicated urging means requires only one gear mechanism 50, offering the advantages of reducing a number of parts used, facilitating the assembly and adjustment of the linear bearing apparatus, and making it unnecessary to expose mechanical parts such as a rack and pinion to the outside.

What we claim is:

1. A linear bearing apparatus which comprises:
    a first guide rail fitted to a first physical body to extend lengthwise thereof and a second guide rail fixed to a second physical body to extend lengthwise thereof, said second physical body being moved toward either sense of the prescribed direction relative to the first physical body;
    a retainer assembly which is disposed between the first and second guide rails, and is formed of a plurality of rolling elements and a retainer for supporting said rolling elements, and, where the second physical body is moved relative to the first physical body for a certain distance, is moved relative to the first physical body for substantially half said distance toward the same sense toward which the second physical body is carried; and urging means for imparting an elastic force to the retainer assembly to prevent said retainer assembly from progressively drifting when the second physical body repeatedly moves relative to the first physical body toward either sense of a direction alternately.

2. The linear bearing apparatus according to claim 1, wherein the urging means is formed of a pair of tension springs, each of which is stretched between the mutually facing ends on both sides of the first guide rail and retainer assembly respectively.

3. The linear bearing apparatus according to claim 1, wherein the urging means comprises:
   a pair of racks fitted to the first and second physical bodies respectively to extend in parallel with the moving direction of the guide rails, the toothed sections of said racks being arranged to face each other;
   a pinion which is engaged with both racks to be moved with the guide rails; and
   an elastic coupling member, one end of which is rotatably fitted to the shaft of the pinion, and the other end of which is connected to the retainer assembly.

4. The linear bearing apparatus according to claim 1, wherein the urging means comprises:
   a pair of racks fitted to the first and second physical bodies respectively to extend in parallel with the moving direction of the guide rails, the toothed sections of said racks being arranged to face each other;
   a pinion which is engaged with both racks to be moved with the guide rails;
   an arm rotatably fitted to the shaft of the pinion; and elastic coupling means for connecting the forward end of the arm to the retainer assembly.

5. The linear bearing apparatus according to claim 1, wherein the urging means comprises:
   a pair of racks fitted to the first and second physical bodies respectively to extend in parallel with the moving direction of the guide rails, the toothed sections of said racks, being arranged to face each other;
   two spatially arranged pinions engaged with both racks;
   a single coupling board supported by the shafts of the two pinions; and
   elastic coupling means for connecting the coupling board to the retainer assembly.

6. The linear bearing apparatus according to claim 1, wherein the urging means comprises:
   a pair of push boards pressed against both ends of the first guide rail and made large enough to close a space between both guide rails; and
   elastic means, one end of which is fitted to the push board, and the other end of which is connected to one of the first physical body, and, where the retainer assembly drifts beyond the end of said one guide rail, urges the retainer assembly to push it backward.

* * * * *